June 25, 1935.  C. D. YOUNG  2,005,983
RAILWAY CAR TRUCK
Filed Nov. 12, 1932  2 Sheets-Sheet 1
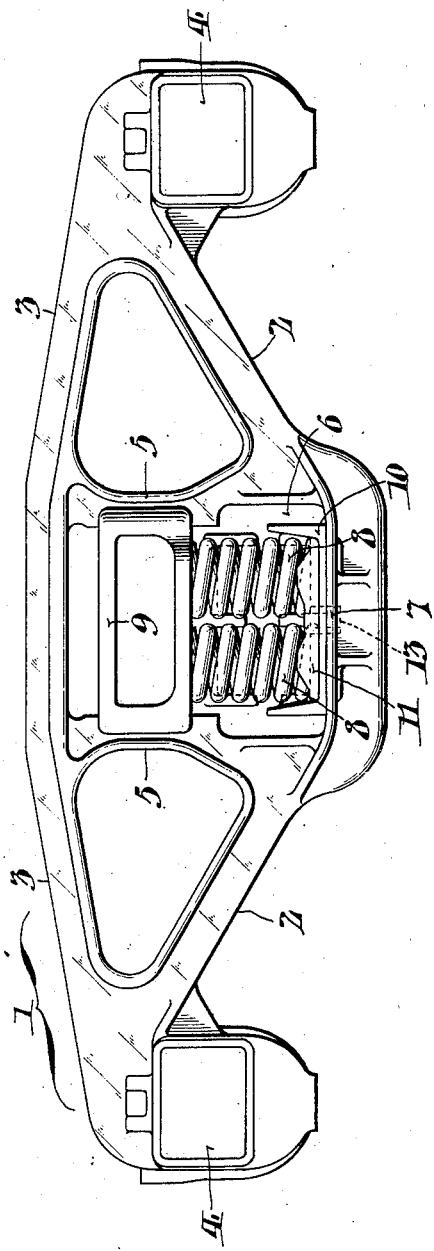
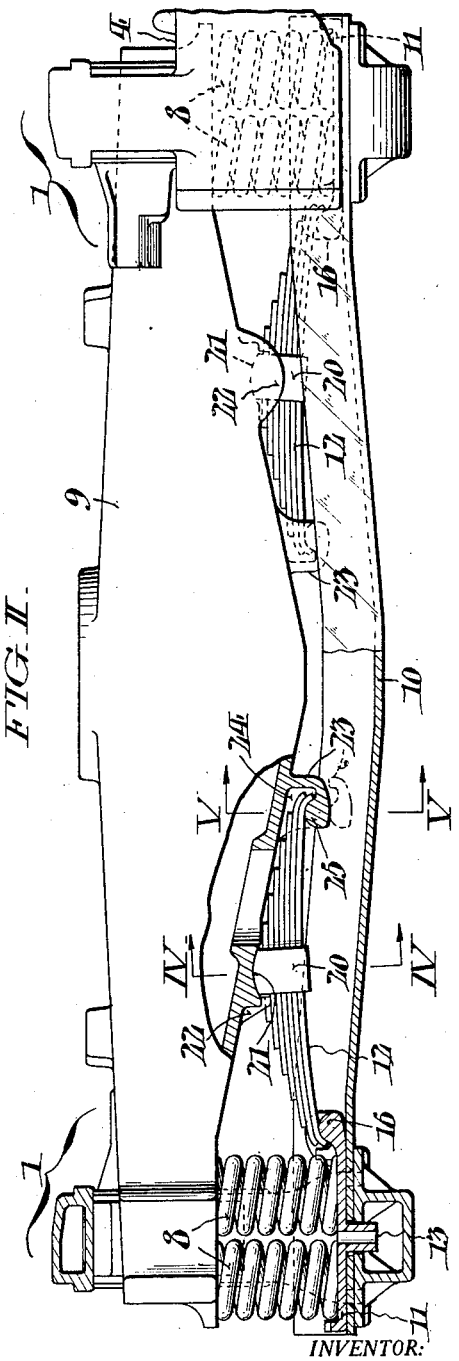
WITNESSES
INVENTOR:
Charles D. Young,
BY
ATTORNEYS.

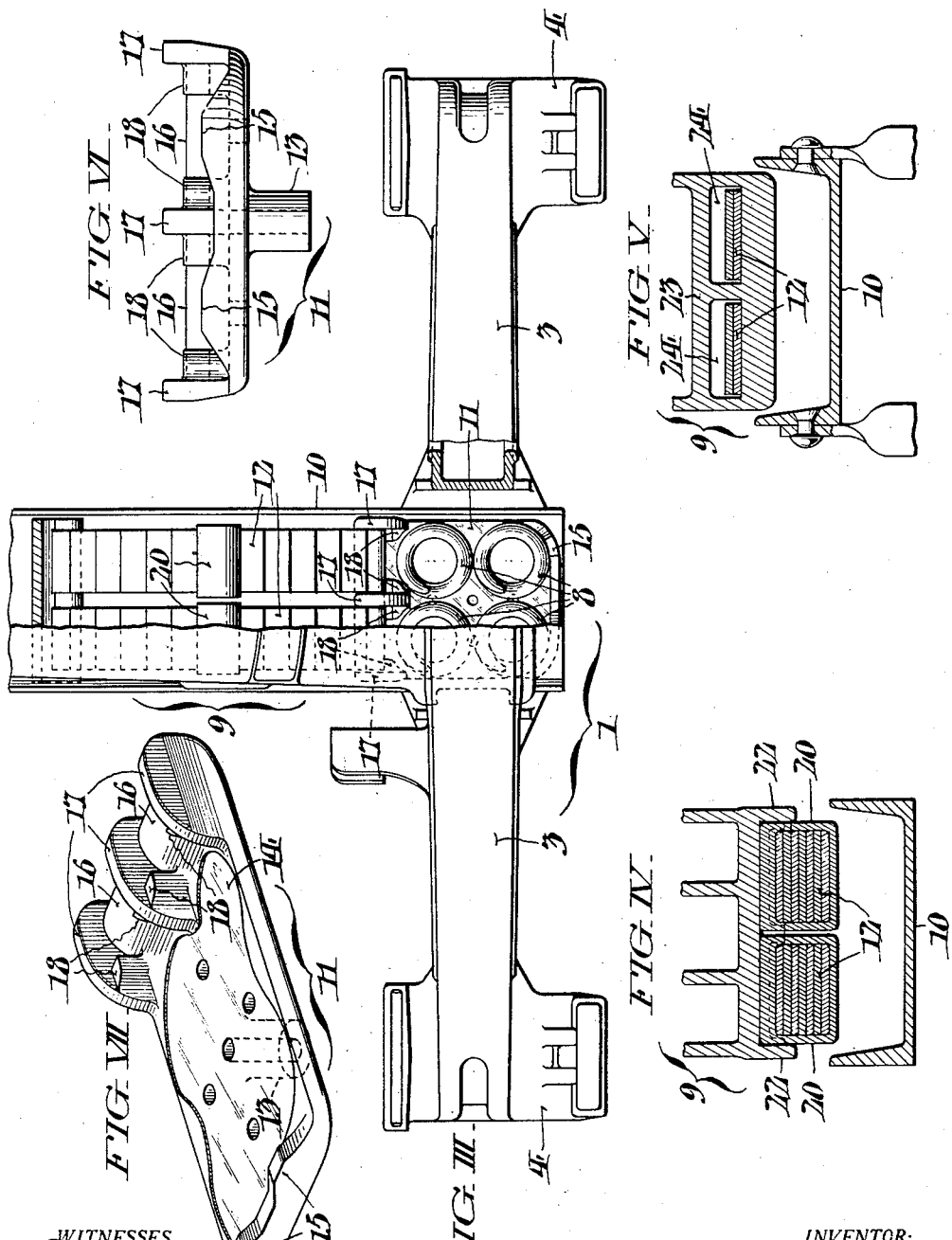

Patented June 25, 1935

2,005,983

UNITED STATES PATENT OFFICE 2,005,983

RAILWAY CAR TRUCK

Charles D. Young, Haverford, Pa.

Application November 12, 1932, Serial No. 642,331

6 Claims. (Cl. 105—197)

This invention relates to railway car trucks, and more particularly to the springs and associated parts by which the truck bolster is supported upon the side frames. Heretofore various attempts have been made to increase the spring capacity of car trucks, and such attempts have involved for the most part radical departures from existing truck design.

The principal object of my invention is to provide a car truck of increased spring capacity wherein the arrangement of springs is such as to require only a few changes in standard truck construction practice.

Another object of my invention is to supplement the helical springs commonly provided at the windows of the truck side frames by additional springs of a type which will break up the harmonic action which characterizes helical springs, thus producing proper riding qualities for the car, at all speeds, not dependent upon the amount of loading, or track conditions. Still other more specific objects and advantages characterizing my present invention will become more fully apparent from the description hereinafter set forth of one embodiment or example of the practice of the invention, the description having reference to the accompanying drawings, whereof:

Fig. I represents a side elevation of a railway car truck embodying my invention.

Fig. II represents a sectional view of the same, showing the arrangement of the bolster, spring plank and side frames.

Fig. III represents a top plan view of a portion of the truck, with certain parts broken away to reveal the spring arrangement.

Fig. IV represents an enlarged cross section of the truck, taken as indicated by the lines IV—IV of Fig. II.

Fig. V represents an enlarged cross section of the truck, taken as indicated by the lines V—V of Fig. II.

Fig. VI represents an enlarged end elevation of a seat member employed within the windows of the side frames to accommodate the lower ends of helical springs; and, Fig. VII represents an enlarged perspective view of the seat member.

With particular reference to Figs. I and II of the drawings, there is shown a truck having side frames 1 of a common construction, each side frame including tension members 2, compression members 3, and journal boxes 4 formed integrally therewith. Guide columns 5 define windows 6 at the center of each side frame 1. The tension members 2 include a web portion 7 upon which helical springs 8 are mounted, there being four such springs at each side of the truck in the illustrated example. A bolster 9 extends between the side frames 1 with its ends supported on the helical springs 8. A spring plank 10 or other connecting member of like nature joins one side frame 1 with the other beneath the bolster 9.

As thus far described, the truck of my invention is in all respects similar to trucks now in common use by railroads. According to the practice of my invention, there is added to the arrangement described above, seat members 11, which are interposed between the spring plank 10 and the bottom ends of the coil springs 7, and additional bolster supporting means in the form of elliptical springs 12, which are disposed between the spring plank 10 and the bolster 9, and which engage certain special formations on the bolster hereinafter described more particularly.

Each seat member 11, as clearly shown in Figs. II, VI and VII, is desirably but not necessarily a separate element, and has thereon a depending cylindrical projection 13 which passes through openings in the ends of the spring plank 10 and in the web portions 7 of the side frames, thereby fixing its position with respect to the side frames and preventing its dislodgment. To accommodate the lower ends of the helical springs 7, each seat member 11 is preferably recessed, as indicated at 14, and provided at its outer end with upstanding flanges 15. At the opposite ends, each seat member 11 is formed with ledges 16 which afford seats for the ends of the elliptical springs 12 associated therewith. In the illustrated example of my invention, two elliptical springs are employed at each side of the truck, and there are two corresponding ledges 16 on each seat member, these ledges being rounded to form surfaces complementary to the downturned extremities of the elliptical springs. It will be noted that the ledges 16 of the seat members 11 project inwardly beyond the regions of the windows 6 of the side frames 1 so that the elliptical springs do not in any way interfere with the arrangement of the helical springs 8. Spaced parallel ribs 17 serve to guide the ends of the elliptical springs, and upstanding abutments 18 adjacent thereto limit movement of the elliptical springs in a direction transverse to the side frames 1.

As clearly shown in Fig. II, the elliptical springs 12 are made up of a plurality of leaves joined together at the center by a spring band 20. At its underside the bolster 9 is formed with curved seats 21 complementary to the top surfaces of the spring bands and adapted to bear thereupon.

Downturned flanges 22, as shown in Fig. IV, confine the elliptical springs against movement in a direction transverse to the bolster.

Intermediate the ends of the bolster 9 depending lugs 23 are provided to support the inner ends of the elliptical springs 12. According to the preferred practice, each lug 23 is formed with rectangular openings 24, through which the ends of the elliptical springs 12 pass, and with rounded ledges 25 complementary to the downturned extremities of the springs.

From the above description it will be apparent that the elliptical springs 12 are in the form of cantilevers; and that by means of the described arrangement, leaf springs of relatively large capacity may be disposed in the small available space between the bolster and spring plank. The elliptical springs 12 act in parallel with the helical springs 8. When the helical springs 8 are solid under excess loading, the lugs 23 of the bolster 9 assume the position shown in broken lines in Fig. II.

With such a combination of helical and elliptical springs, the helical springs serve to carry the major portion of the load, whereas the elliptical springs break up the harmonics caused by the usual action of helical springs alone. Thus increased capacity and smoother riding qualities are obtained. It is to be especially noted that the incorporation of the elliptical springs in a car truck according to the practice of my invention does not necessitate any change in the number and disposition of the helical springs within the windows of the side frames. The helical springs are maintained intact. Moreover, it is a very simple matter to convert existing car trucks to trucks embodying my invention, as this conversion necessitates no change in the side frames and spring planks, and only a slight change in the construction of the bolsters.

While I have described one particular example of a car truck of my invention, it will be apparent that various changes may be made as to the form and arrangement of the springs and associated parts, without departing from the spirit of my invention as defined in the annexed claims.

Having thus described my invention, I claim:

1. In a car truck, the combination of side frames, a bolster having vertical sliding engagement with said frames, coil springs carried in the window openings of said frames for supporting said bolster, and a leaf spring in each end of said bolster having two points of bearing contact therewith, the outer ends of said leaf springs being supported on and having non-shiftable connection with said frames.

2. In a car truck, the combination of side frames having window openings and spring seats therein, a bolster having vertical sliding engagement with said frames, coil springs carried on said seats in the window openings of said frames and serving to support said bolster, and a leaf spring at each end of said bolster having two points of bearing contact therewith, the outer ends of said leaf springs being supported on ledges on said side frames projecting inwardly from the coil spring seats.

3. In a car truck, the combination of side frames having window openings therein, a bolster having vertical sliding engagement with said frames, coil springs carried in the window openings of said frames and serving to support said bolster, and a leaf spring at each end of said bolster having two points of bearing contact therewith, the outer ends of said leaf springs being supported on and having non-shiftable connection with members projecting inwardly from said frames at the inner edges of said window openings.

4. In a car truck, the combination of side frames having window openings and spring seats therein, a bolster having vertical sliding engagement with said frames, coil springs carried on said seats in the window openings of said frames and serving to support said bolster, a leaf spring at each end of said bolster having two points of bearing contact therewith, and ledges extending inwardly from said side frames beyond the seats for said coil springs, said ledges forming points of bearing contact for the outer ends of said leaf springs.

5. In a railway car truck, opposite side frames having windows therein, a spring plank joining said side frames at said windows, seat members superposed upon the ends of said spring plank at said windows and having integral ledges extending inward beyond the region of said windows, springs mounted on said seat members, a bolster extending between said side frames with its ends supported on said springs, and additional bolster supporting means comprising springs disposed between said spring plank and bolster with their ends engaging the ledges of the seat members aforesaid.

6. In a railway car truck, opposite side frames having windows therein, a spring plank joining said side frames at said windows, seat members superposed upon the ends of said spring plank at said windows and having integral ledges extending inward beyond the region of said windows, helical springs mounted on said seat members, a bolster extending between said side frames with its ends supported on said springs, and additional bolster supporting means comprising elliptical cantilever springs disposed between said spring plank and bolster with the inner ends engaging formations on said bolster and their outer ends engaging the ledges aforesaid.

CHARLES D. YOUNG.